Patented Sept. 10, 1929.

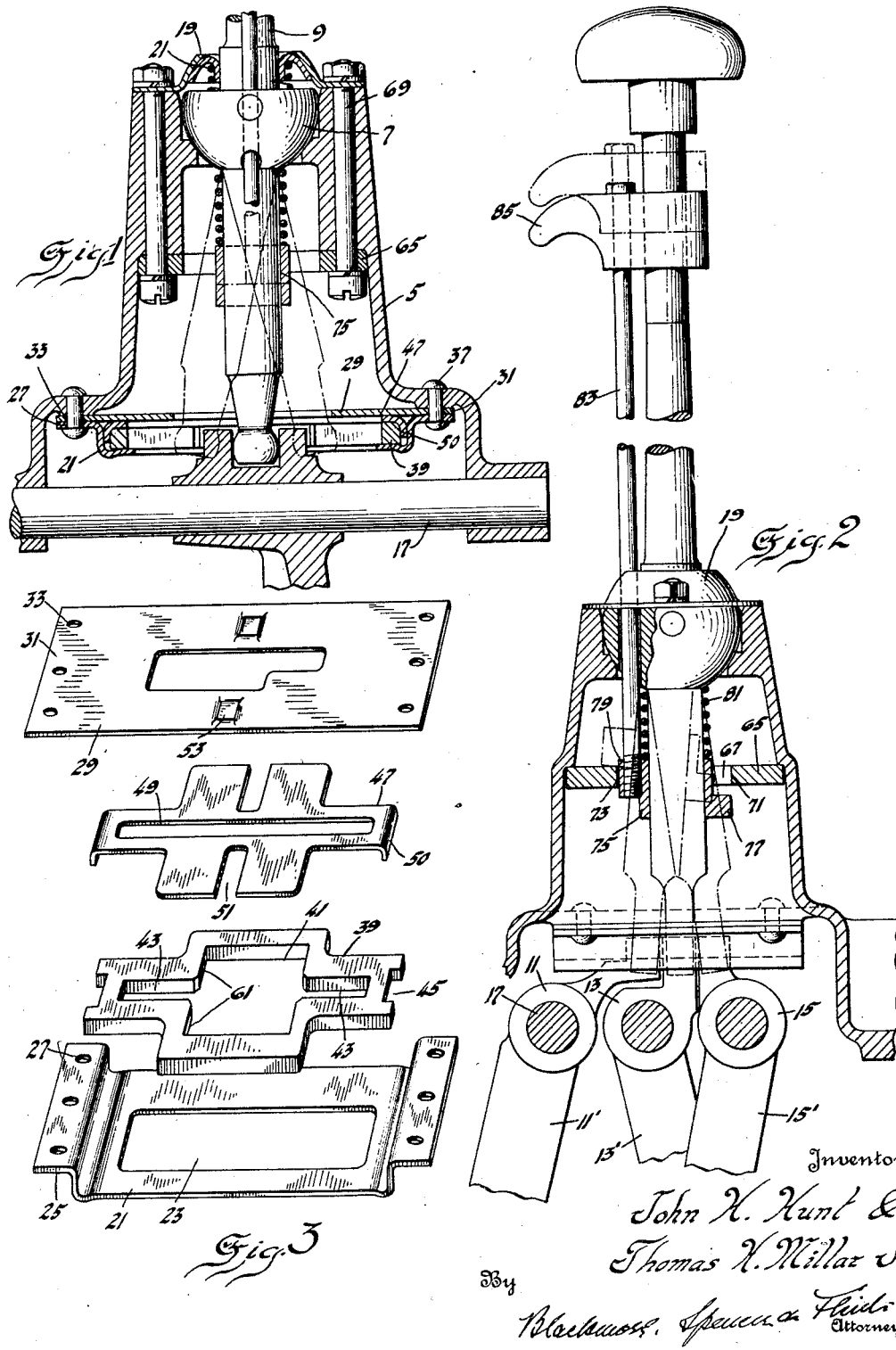

1,727,646

UNITED STATES PATENT OFFICE.

JOHN H. HUNT AND THOMAS H. MILLAR, JR., OF DETROIT, MICHIGAN, ASSIGNORS TO GENERAL MOTORS CORPORATION, OF DETROIT, MICHIGAN, A CORPORATION OF DELAWARE.

FOUR-SPEED-TRANSMISSION GATE DEVICE.

Application filed March 14, 1927. Serial No. 175,240.

This invention relates to variable speed power transmission, and particularly to a four forward speed transmission. In accordance with our invention we make use of a novel gate device associated with this shift lever.

An object of the invention is to render easy, quick and certain the shift from low speed to reverse and vice versa in a plural speed transmission.

As a further object the invention provides for limiting the shifting to two ranges, one range including all forward speeds and the other range including reverse, low and second speeds.

Other objects and advantages will be understood upon a reading of the following specification and an examination of the accompanying drawing.

In the drawing:

Figure 1 is a vertical longitudinal section through the top of a change speed transmission housing.

Figure 2 is a transverse section showing the operating lever and the forks.

Figure 3 shows in perspective the disassembled parts constituting the interlock.

In transmissions of this general type using three forks or three rails, there has been recognized a difficulty when moving the lever transversely. The hand on the knob of the lever cannot easily and quickly detect the intermediate position wherein the lever engages the middle fork which is ordinarily used to shift into low or second speed. To assist in locating this position and avoid a shift from the high speed rail clear across into the reverse rail it is customary to employ a stop, which, unless released, stops the lever at the middle rail. This stop must be positively released before the lever may be shifted into the reverse rail or fork.

An arrangement of this kind operates very well for forward driving. There are times, however, when quick shifts must be made back and forth between low and reverse. The difficulty of locating with certainty the mid position when shifting from reverse into low makes it necessary under these circumstances to lock the lever out of reverse each time so that the stop may be used as a locater for the low speed position. These movements of the stop take time and render the shifting back and forth between low and reverse slow. This serious objection our invention aims to overcome.

Referring to the drawing, numeral 5 represents a portion, the projecting upper part of a transmission housing. This upper part 5 of the housing is shaped to seat the ball 7. The shift lever, by means of a ball joint, is thus given both a longitudinal movement for moving longitudinally any one of the three forks 11, 13 and 15 with which its lower end may be engaged, and also a transverse movement for selectively engaging any one of the three forks. As illustrated, these forks are mounted on rods 17, with which or upon which they move. The forks have projecting ends 11′, 13′ and 15′ to engage the slidable gears or other movable parts to affect the several gear ratios provided. The cap 19 and spring 21 are incidental to the lever mounting and constitute no part of our invention.

Figure 3 illustrates an interlock designed for use with the lever and the several forks. It includes four plates which may be very economically made by stamping. A supporting plate 21 is generally rectangular in shape. It has a substantially rectangular opening at 23. Its ends are upwardly bent and provided with attaching flanges 25. In the flanges are apertures 27. A cover plate 29 has its ends 31 provided with apertures 33 registering with apertures 27 through which apertures 27 and 33 and openings in an enlarged part of the housing fastening means 37 are placed. The cover plate has a central opening shaped as shown to permit the lower end of the lever to move as required to make the several shifts provided for. An interlocking plate 39 has a rectangular opening 41 from the ends of which extends longitudinal passages 43 to permit the movement of the lower end of the lever when shifting the forks. Plate 39 is also provided with end notches 45. A top plate 47 has a long slot 49 registering with the intermediate part of opening 41 and with passages 43 in the interlocking plate 39. The ends of cover plate 47 are turned down as at 50 and engage notches 45 in the interlocking plate. Plate 47 is also provided with slots 51 which are guided by downturned lugs 53 in the cover plate 29. The downturned ends 50 and notches 45 render cover plate 47 and interlocking plate 39 relatively immovable. The two plates can have no longitudinal movement owing to the engagement of their ends with the upturned ends of the supporting plate, as clearly shown in Figure 1. They are free, however, to slide transversely on the supporting plate guided by the slots 51 and the projection 53. They are moved transversely by the lever 9 whenever the lever is moved transversely, owing to the engagement of its lower end against one side or the other of slot 49.

The three forks 11, 13 and 15 project into openings 41 of the interlocking plate, as shown in Figure 1. The transverse dimension of plate opening 41 is sufficiently larger than the total width of the three forks as to render it possible to move the interlocking plate and top plate transversely in either direction from a middle position. In its middle position the slots 49 and 43 lie over the middle fork and in its transverse positions these slots overlie one or the other of the end forks 11 and 15. When the lever is in its middle position with the slots 49 and 43 over the middle fork the side forks are held from longitudinal movement by engagement with the walls 61 of the interlocking plate opening. In this position, owing to the registration of the slots with the middle fork, the lever may be moved longitudinally to move that fork. A forward movement of the knob end of the lever corresponds to a first speed shift and a rearward movement of the lever corresponds to a second speed shift. If now the lever is returned to its mid position longitudinally and moved transversely, the knob away from the operator, the walls 61 hold both the middle fork and the reverse fork and slots 49 and 43 permit the lever to be moved longitudinally with a movement of the third and fourth speed fork. When the lever knob is moved forwardly, a shift is made into third speed, and when moved backwardly a shift is made into fourth speed. If the lever is moved from its mid longitudinal position transversely to the reverse fork a rearward movement shifts that fork to make the gear engagement for driving in reverse, the middle fork and the high speed fork being locked by engagement with the walls 61. Inasmuch as the reverse fork needs to be moved in but one direction from its mid position the opening in the cover plate is reduced in width on one side as shown in Figure 3, thereby limiting the movement of the lever.

A plate 65, having an opening 67, is secured to the housing by bolts 69. The opposite walls of this opening 71 and 73 may be engaged by a block 75 slidable on the lever. The block is shaped as shown, having a projection 77 at its lower end directed toward one wall 71, and an upper projection 79 on the other side to engage the other wall 73. A coil spring 81 surrounds the lever and tends to hold the block downwardly in its lowermost position. This is the position shown by full lines in Figure 2. As there shown, the lower projection 77 lies below the wall 71 and the lever may be moved to engage both the middle (low and second) fork and the right fork (third and high). In this position the upper projection 79 is so located as to engage wall 73 and prevent the lever being moved transversely to engage fork 11 for a shift into reverse. A rod 83 is mounted alongside the lever and at its lower end is threaded into block 75. At its upper end, adjacent the lever knob, the rod is provided with a hand grip 85 by which the block may be lifted against the tension of spring 81. So moving the block raises projection 79 sufficiently to permit the lever to be moved transversely to effect engagement with the reverse fork. At the same time, however, projection 77 is raised so that the third and fourth speed fork cannot be used, owing to the engagement of 77 with wall 71.

By this expedient the disadvantage of the commonly employed releasable stop is avoided. With the block in its normal "full line" position shifts may be made through the four forward speeds using the middle and the right fork without the possibility of accidentally slipping into reverse. Should it be necessary to use reverse the dotted line position is used. When parts are in this position, if a quick shift into low is desired it may be made without first moving the block 75 and with no possibility of getting the lever into the third and fourth speed fork, as such a movement is rendered impossible by the engagement of the block with wall 71. It may be noted, also, that there is no danger of accidentally shifting from low into second because to do so would require a longitudinal reversing of the movement of the lever.

There are thus provided by the movable device two positions of action, one wherein shifts may be made in all four forward speeds and a second position wherein shifts may be made utilizing the middle and reverse fork only. Rapid, certain shifting is thus made possible for all movements which may be needed or desired by a construction at once simple, easily applied and economical to manufacture.

We claim:

1. In a gear shifting device, a lever having three transverse positions for gear shifting, means associated therewith including co-operating members one of which is movable to two locations whereby in each of said locations the intermediate position and one of the two extreme positions only of said lever is available.

2. In a gear shifting device, a lever having three transverse positions for gear shifting, means on said lever movable to two locations, means associated with said first mentioned means whereby in one location of said first mentioned means the intermediate and one extreme position only of said lever is available and in another location the intermediate and the other extreme position only is available.

3. In a change speed transmission, three shifting members mounted for longitudinal movement, operating means to selectively engage said shifting members and move the same, movable mechanism associated therewith and a fixed abutment associated with said movable mechanism to restrict the operation of said operating means to selected pairs of said shifting members.

4. The invention defined by claim 3, each of said pairs including the intermediately positioned member.

5. In a gear shifting mechanism, a housing, a lever therein for shifting gearing, abutments in said housing, a member movable on said lever to engage the one or the other of said abutments whereby the lever may be restrained from shifting the mechanism into reverse, or from shifting the mechanism into high speed.

6. In a gear shifting mechanism, a housing, a lever projecting into said housing, a plate carried by said housing and having abutments in a common plane on opposite sides of said lever, a block slidable on said lever having an upper projection on one side to engage with one of said abutments in one position of the block, and a lower projection on the other side to engage the other abutment in a second position of the block, and means to move the block.

7. In a gear shifting mechanism, a lever movable for shifting said mechanism for driving in forward speeds and in reverse, a fixed abutment, locking means movable to a plurality of positions of engagement with said abutment to prevent a shifting into reverse in one of said positions and to prevent a shifting into high speed in another of said positions.

8. In combination, change speed transmission, a plurality of movable members operably related to said transmission to effect a plurality of speed ratios including a low speed ratio, a shift lever movable to individually engage said members, movable means controlling said lever movements, and movable into two positions, in each of which positions the lever has a definite range of movement, an abutment engaged by said movable means in each position, each range including a lever position wherein it engages the member operable to give the low speed ratio.

9. The invention defined by claim 8, one of said ranges also including a lever position wherein it may engage the member operable to give reverse drive, but which range is limited to exclude that position of the lever wherein it operates the member controlling high speed, the lever in its other range operable upon the high speed controlling member but inoperable upon the reverse controlling member.

In testimony whereof we affix our signatures.

JOHN H. HUNT.
THOMAS H. MILLAR, JR.